United States Patent [19]

Zadoo

[11] 3,865,128

[45] Feb. 11, 1975

[54] PRESSURE REGULATING AND SHUT-OFF VALVE

[76] Inventor: Vijay K. Zadoo, 1240 N. Wheeling Rd., Mt. Prospect, Ill. 60070

[22] Filed: Oct. 15, 1973

[21] Appl. No.: 406,597

Related U.S. Application Data

[63] Continuation of Ser. No. 287,229, Sept. 8, 1972, abandoned.

[52] U.S. Cl................. 137/220, 137/505, 137/509, 277/193
[51] Int. Cl...................... F16k 31/363, F16k 31/42
[58] Field of Search .......... 137/219, 220, 221, 222, 137/492, 505, 509; 277/192, 193, 198

[56] References Cited
UNITED STATES PATENTS

| 3,092,132 | 6/1963 | Guy et al. | 137/219 |
|---|---|---|---|
| 3,399,690 | 9/1968 | Guy | 137/220 |
| 3,533,434 | 10/1970 | Smith | 137/220 |
| 3,802,711 | 4/1974 | McGee | 277/193 |

FOREIGN PATENTS OR APPLICATIONS

| 341,798 | 1/1931 | Great Britain | 277/198 |
|---|---|---|---|
| 735,750 | 11/1932 | France | 277/193 |

Primary Examiner—Alan Cohan
Assistant Examiner—Gerald A. Michalsky
Attorney, Agent, or Firm—Lloyd L. Zickert

[57] ABSTRACT

An inline pressure regulating and shutoff valve having a modulated open position wherein fluid is caused to flow from an inlet port to an outlet port at a constant predetermined pressure, and further having a closed position wherein the flow of fluid is completely stopped. The valve is lightweight and reliable in operation, requiring only one movable member in the form of a sleeve or shuttle to accomplish shut-off flow control and regulation. An integral pressure regulator and solenoid-operated valve are provided to position the movable member according to the demands of the system.

1 Claim, 7 Drawing Figures

PRESSURE REGULATING AND SHUT-OFF VALVE

This is a continuation of application Ser. No. 287,229, filed Sept. 8, 1972, now abandoned.

This invention relates in general to a pressure regulating and shut-off valve, and more particularly to a compact lightweight pneumatic pressure regulating valve having a high degree of reliability and a minimum number of moving parts.

Fluid pressure systems have found wide application in airplanes and other vehicles where weight must be kept at a minimum without sacrificing performance and reliability. Typically, these systems require one or more pressure regulating valves to permit their operation to be controlled from a remote location under varying load conditions. For example, jet aircraft often employ wing de-ice systems which are powered by bleed air derived from their turbine engines. A pressure regulating valve is required to regulate the bleed air to compensate for variations in throttle settings and icing conditions and to permit the system to be controlled from the aircraft flight deck.

To be suitable for use in aircraft systems a pressure control valve must be reliable in performance, low in weight and compact in size. Furthermore, such a valve should preferably be self-powered, utilizing the pressure within the system itself for supplying the actual effort required to open and close the valve.

The invention is directed to a pressure regulating and shut-off valve which comprises a housing having inlet and outlet ports, a valve support member axially aligned with the housing between the inlet and outlet ports to define a generally annular passageway within the housing, and a valve sleeve or shuttle slidably carried on the support member and movable toward and away from the outlet port to coact with a valve seat formed on the housing to regulate flow through the passageway. First and second pressure control chambers are pneumatically isolated from each other by seal rings, and serve to control the sleeve position. One of the chambers communicates with the downstream pressure and is on one side of a piston integral with the sleeve. The other chamber is on the other side of the piston and communicates selectively with atmosphere to cause the sleeve to move to closed position, or with a pressure regulator responsive to the inlet pressure to control the sleeve position and maintain a predetermined pressure at the outlet port.

Accordingly, it is an object of the present invention to provide a new and improved pressure regulating and shut-off valve to function as a shut-off valve or as a pressure regulating valve to maintain a constant pressure.

It is a further object of the present invention to provide a new and improved pressure regulating and shut-off valve combining improved reliability with minimum weight and minimum size.

It is a still further object of the present invention to provide a pressure regulating and shut-off valve having only a single moving part capable of controlling both shut-off and pressure regulation.

Other objects, features and advantages of the invention will be apparent from the following detailed disclosure, taken in conjunction with the accompanying sheets of drawings, wherein like reference numerals refer to like parts, in which.

Figures 1, 2:
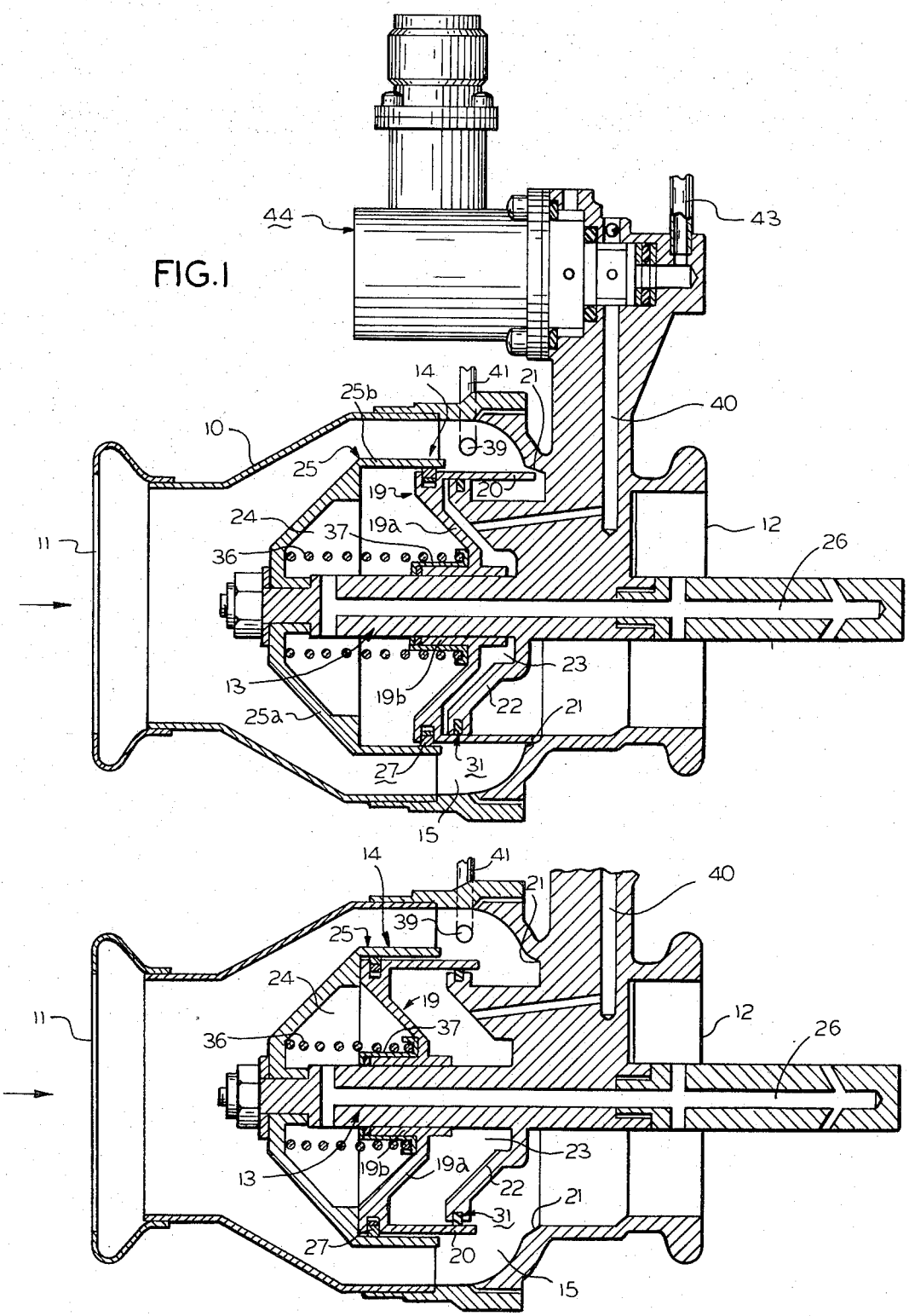
FIG. 1 is an axial cross-sectional view of a pressure regulating and shut-off valve constructed in accordance with the present invention and illustrating the position of the movable sleeve when the valve is closed.
FIG. 2 is identical to the view of FIG. 1 except illustrating the position of the sleeve when the valve is open.

Referring to FIG. 1, an inline pressure regulating valve constructed in accordance with the invention includes a housing or shell 10 having axially aligned inlet and outlet ports 11 an 12, respectively. While these ports are shown as having approximately the same cross-sectional area, it will be appreciated that they can be of different sizes if desired and need not be necessarily aligned with the axis of the housing. Furthermore, the outside configuration of the housing may take other forms, but is preferably cylindrical with an enlarged area about its midsection necking down to accommodate the smaller diameter inlet and outlet ports.

Figure 3:
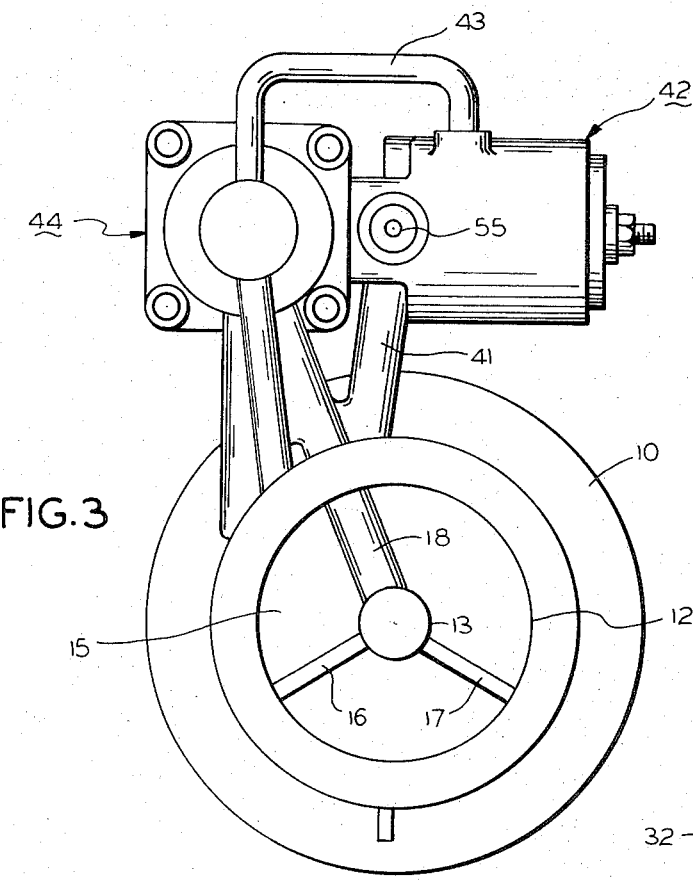
FIG. 3 is an end elevational view of the valve of FIG. 1 looking at the outlet end.

A cylindrical support member or guide rod 13 is provided within housing 10 coaxial with the valve axis and supported within the housing for in turn supporting the valve regulating and shut-off assembly 14. An annularly shaped fluid passageway 15 is defined between the assembly 14 and the housing 10. This support member 13, as seen in FIG. 3, is supported along the axis of the housing by a pair of radially-arranged arms 16 and 17 and a support leg 18.

An actuator piston or shuttle 19 includes an annular inverted frusto-conical portion 19a carried on an axially extending collar portion 19b slidably supported within housing 10 on the support member 13. The cylindrical sleeve portion 20 extends from the periphery of the portion 19a toward the outlet port and parallel to the axis of the housing. The free end of the sleeve coacts with an annular valve seat 21 formed within the housing 10 and internally seals with a conical wall 22 integral with the support member 13 to form with the piston portion 19a a control pressure chamber 23. In the closed and partially open positions of the valve the sleeve 20 extends beyond wall 22 to obstruct passageway 15 such that the flow of fluid therethrough can be selectively limited or regulated. In the open position of the valve this wall is sufficiently retracted to present little or no obstruction to passageway 15.

A reference pressure chamber 24 is formed on the other side of actuator piston 19 by the piston portion 19a and an end bell 25 having a dish-shaped frusto-conical end portion 25a symmetrically disposed over the end of support member 13 and a cylindrical wall portion 25b in sealing engagement with the inlet end of the sleeve 20. The side of this end bell facing the outlet opposes piston 19 and the cylindrical portion 25b of the end bell has a radius such that it coacts with the outer circumference of the piston to provide a pressure seal. The pressure in chamber 24 is equalized to that at outlet port 12 by means of an axially extending passageway 26 within support member 13. This passageway extends from chamber 24 to a point beyond discharge port 12 and is ported at both ends to achieve the desired identity of pressure between the reference chamber and the downline pressure of the valve.

Figure 4:
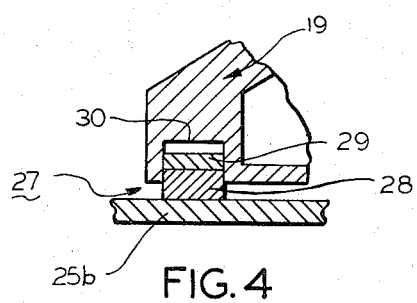
FIG. 4 is an enlarged cross-sectional view of one of the seal ring assemblies.

An expanded-ring pressure seal assembly 27 is provided between the inside surface of the cylindrical wall 25b of the end bell 25 and the outer circumference of sleeve 20 to isolate the relatively low pressure environment of pressure chamber 24 from the relatively high pressure environment of passageway 15. A preferred construction for this pressure seal assembly is shown in FIG. 4; the seal assembly comprising a split carbon outer ring 28 and an inner expander ring 29 made of Inconel (trademark) formed to fit within an annular groove 30 on the circumference of piston 19. Ring 28 functions as the sealing ring, and ring 29 functions as an expansion ring, the two rings coacting in a manner well known to the art to form a pressure seal. The relatively large pressure differential between chamber 24 and passageway 15 presses the rings into a sufficiently tight engagement with the walls of annular groove 30 and the inside surface of end bell wall 25b to obtain the desired pressure seal.

Figure 5:
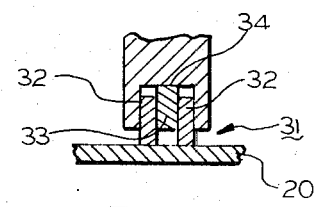
FIG. 5 is an enlarged cross-sectional view of another seal ring assembly.

The slidable bearing surface between sleeve 20 and conical wall 22 is sealed by a seal assembly 31 mounted in a groove 34 formed at the periphery. Here the pressure differential between chamber 23 and the outlet port is low, on the order of 1.5 psi or less, so that a two-ring pressure seal such as that previously described does not provide a sufficient seal. Instead, the three-ring seal 31 is used as illustrated in FIG. 5. This seal comprises two expansion rings 32 disposed on either side of a contraction ring 33 within the annular groove 34. These rings provide a sufficient seal even at low differential pressures because in all instances the expansion rings are urged into tight engagement with the cylindrical wall 20 of the actuator piston and the side walls of the annular groove, while the contraction ring 33 presses against the bottom of the groove to prevent air leakage under the expanding rings.

Figure 6:
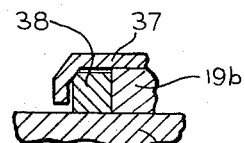
FIG. 6 is an enlarged cross-sectional view of still another seal ring assembly.

The piston 19 and sleeve 20 are biased toward valve seat 21 by a helical compression spring 36, which abuts the truncation of the end portion of end bell 25 at one end and the base of piston 19 at its other end. A cylindrical clip 37 is disposed between spring 36 and collar 19b for the purpose of obtaining a pressure seal between chambers 23 and 24 along the guide rod 13. As shown in FIG. 6, this clip includes a radially inwardly extending lip portion which holds a single carbon contraction ring 38 in tight engagement with the guide rod 13, thereby forming a pressure seal between these members, and hence between the pressure chambers.

Figure 7:
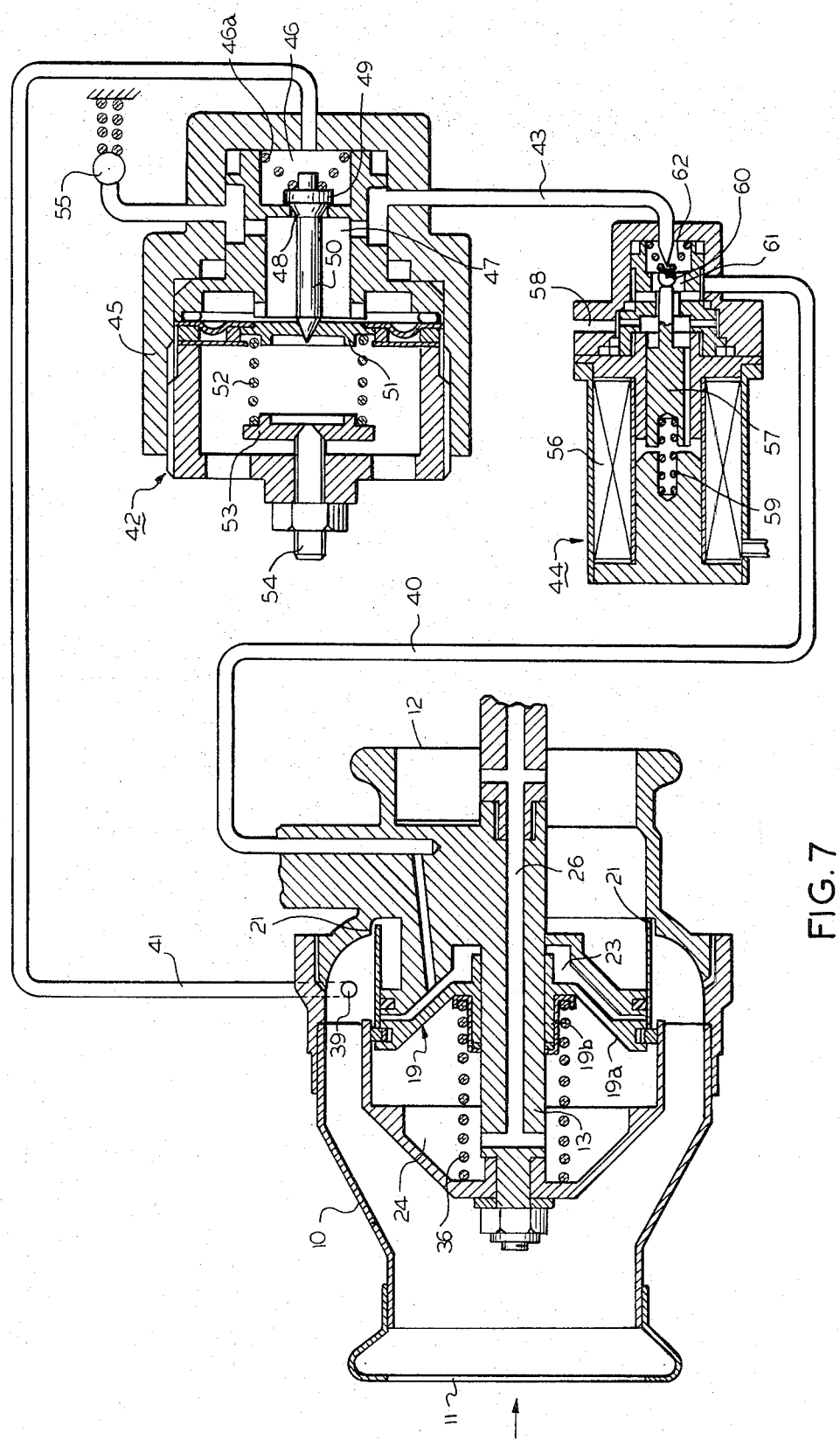
FIG. 7 is a flow diagram, partially in cross-section, showing the various components of the valve assembly of FIG. 1.

Control of the valve is accomplished by supplying control pressure through a control loop to the control pressure chamber 23. Control pressure is obtained from the pressure system in which the valve is being used by means of an inlet port 39 in the high pressure upstream portion of passageway 15, and is supplied to control chamber 23 by way of a passageway or line 40 in support leg 18. Referring to FIG. 7, the control loop is seen to serially comprise, starting at inlet port 39, a fluid line 41, a pressure regulator 42, a fluid line 43, a solenoid-operated valve 44, and line 40.

High pressure derived at inlet port 39 is supplied via line 41 to regulator 42. This regulator may be conventional in design and operation, comprising a body 45 having a cylindrical inlet chamber 46 and a cylindrical outlet chamber 47. The two chambers are axially aligned and interconnected by a valve opening 48, which is at least partially blocked by a frusto-conical valve 49 to limit flow between the chambers. Valve 49 is carried on a valve stem 50 which is axially aligned with valve opening 48 and the two chambers. The other end of outlet chamber 47 is formed by a diaphragm 51 centrally apertured to receive the other end of valve stem 50, which is tapered to form a needle valve. Diaphragm 51 is biased inwardly towards chamber 47 by a helical compression spring 52, which abuts an adjustable platform member 53. The lateral position of member 53 is adjustable by means of a machine screw and lock nut assembly 54 to enable the force exerted by spring 52 on diaphragm 51 to be adjusted. An additional compression spring 46a in chamber 46 bears against the back of valve 49 to maintain valve stem 50 in engagement with the aperture in diaphragm 51. Additional regulating capacity is achieved by providing a pressure relief valve 55 to vent chamber 47 when the pressure therein exceeds a predetermined level.

During operation of regulator 42 high pressure fluid enters chamber 46 by way of line 41. Spring 52 initially biases valve 49 open so that the high pressure fluid in chamber 46 can enter chamber 47. As the pressure in chamber 47 increases, it opposes spring 52, eventually forcing diaphragm 51 to move outwardly and thus allowing valve stem 50 and valve 49 to partially block passageway 48. This lowers the pressure in chamber 47 until as equilibrium condition is finally reached, the equilibrium pressure depending on the force exerted by spring 52 and hence on the setting of adjustment screw 54. Should the pressure in chamber 47 continue to increase, a point is eventually reached at which the diaphragm 51 lifts free of the tapered end of valve stem 50, opening the aperture in the diaphragm formerly closed by the valve stem and allowing fluid to escape from chamber 47 into the atmosphere through vent holes in the regulator body.

The regulated pressure developed in chamber 47 is supplied by line 43 to valve 44, which may be conventional in design and construction. This valve basically comprises an electrical solenoid 56 which actuates a slidable armature member 57 to selectively connect line 40 to either line 43 or to atmosphere via a vent 58. Armature member 57 is biased outwardly away from coil 56 by a helical compression spring 59 and contains a diametrically reduced portion at its outer end which extends into and against a spherical valve member 60 within a cylindrical valve chamber 61. Both ends of this valve chamber are reduced in diameter, effectively forming opposed valve seats for the spherical valve member, which is biased against the end of member 57 by a compression spring 62 contained within the chamber.

When current is supplied to coil 56 to energize valve 44, member 57 retracts against spring 59, allowing compression spring 62 to force the spherical valve member 60 against the valve seat on the left side of chamber 61. This opens the port on the right side of the chamber and allows pressure from regultor 42 to enter line 40. Conversely, when coil 56 is not energized, compression spring 59 forces the spherical valve against the valve seat on the right side of the chamber and vents line 40 to the atmosphere through the port on the left side of the chamber and vent 58. Thus, valve 44 supplies regulated pressure to control chamber 23 when the solenoid is activated, and vents chamber 23 to the atmosphere when the solenoid is not activated.

In operation, the pressure regulating valve of the present invention can selectively function to either shut off flow completely when solenoid valve 44 is de-energized, or to regulate flow at a predetermined pressure setting when valve 44 is energized. In the first instance valve 44 is not actuated and control chamber 23 is vented to the atmosphere, allowing the downstream pressure communicated to chamber 24 by passageway 26 and the force exerted by compression spring 36 to move actuator piston 19 toward valve seat 21 until its cylindrical wall portion effectively closes off passageway 15. In the second instance, valve 44 is actuated, causing the pressure in control chamber 23 to build up to the pressure setting of regulator 42. Then, assuming the downstream pressure communicated to reference chamber 24 is lower than the regulator pressure in control chamber 23, actuator piston 19 and sleeve 20 moves to open passageway 15 to increase the downstream pressure. Should the pressure in reference chamber 24 become greater than that in control chamber 23, actuator piston 19 will slide toward valve seat 21 to obstruct passageway 15 to allow less fluid to pass. Thus, the valve in its open position effectively regulates the downstream pressure to compensate for both load and supply variations.

While the invention has been shown in the form of a valve intended to control pneumatic pressure in an aircraft, it will be appreciated that it can be used for controlling other types of fluids as well. Furthermore, it will be appreciated that while the actuator piston wall 19a and end bell wall 25a have been shown as frusto-conical cylinders, and wall 22 as a conical member, these elements can assume other shapes and sizes without affecting the operation of the invention. For instance, piston wall 19a and end bell wall 25a could have flat end portions and wall 22 could be a disc shaped member.

Thus, a lightweight pressure regulating valve has been shown and described which effectively modulates the flow of fluid in a fluid pressure system to maintain a constant downstream pressure notwithstanding supply and load variations. The valve is ideally suited for us in aircraft systems since it does not require external power, utilizes a minimum number of moving parts, and is very lightweight and compact in design.

It will be understood that modifications and variations may be effected without departing from the scope of the novel concepts of the present invention, but it is understood that this application is to be limited only by the scope of the appended claim.

The invention is hereby claimed as follows:

1. An inline pressure regulating and shutoff valve comprising a tubular casing having an inlet and an outlet coaligned therewith, an axially extending rod supported within said casing, a first end wall on said rod adjacent the inlet and a second end wall on said rod adjacent the outlet, an annular valve seat at the outlet, a cylindrical skirt extending from the first end wall toward the valve seat defining an annular passageway with the casing and an annular opening with said valve seat, a piston slidable on said rod and in peripheral sealing engagement with said skirt, a valve sleeve extending from said piston and movable between open and closed positions with respect to said opening and valve seat, means sealing said second end wall with said valve sleeve, said sealing means including an annular groove in the periphery of the end wall, and a seal assembly in said groove having a contracting ring engaging the bottom of the groove sandwiched between a pair of expanding rings engaging said valve sleeve, said contracting and expanding rings being constructed to perform independent radial contracting and expanding functions due to their own natural bias, return spring means continually biasing said piston and sleeve towards closed position, said piston defining a first chamber with said first end wall and said skirt and a second chamber with said second end wall and said sleeve, means continually venting said first chamber to the pressure at the outlet, a pressure regulator having an inlet connected to the inlet pressure ahead of the valve seat and an outlet, and a control valve selectively connecting said second chamber to either the outlet of the pressure regulator or atmosphere, wherein the sleeve moves to closed position when the second chamber is connected to atmosphere and modulates its position to regulate flow through said opening in response to the inlet pressure when the second chamber is connected to the pressure regulator to maintain a constant outlet pressure.

* * * * *